(12) United States Patent
Kalenborn

(10) Patent No.: US 10,612,503 B2
(45) Date of Patent: Apr. 7, 2020

(54) DUAL-FUEL INJECTOR

(71) Applicant: L'ORANGE GMBH, Stuttgart (DE)

(72) Inventor: Markus Kalenborn, Dornstadt (DE)

(73) Assignee: Woodward L'Orange GmbH, Stuttgart (DE)

( * ) Notice: Subject to any disclaimer, the term of this patent is extended or adjusted under 35 U.S.C. 154(b) by 0 days.

(21) Appl. No.: 15/106,713

(22) PCT Filed: Nov. 13, 2014

(86) PCT No.: PCT/EP2014/003046
§ 371 (c)(1),
(2) Date: Jun. 20, 2016

(87) PCT Pub. No.: WO2015/090494
PCT Pub. Date: Jun. 25, 2015

(65) Prior Publication Data
US 2017/0002780 A1    Jan. 5, 2017

(30) Foreign Application Priority Data

Dec. 20, 2013   (DE) .................. 10 2013 021 810

(51) Int. Cl.
*F02M 43/04*     (2006.01)
*F02M 63/00*     (2006.01)
(Continued)

(52) U.S. Cl.
CPC ......... *F02M 43/04* (2013.01); *F02D 19/0694* (2013.01); *F02D 19/10* (2013.01);
(Continued)

(58) Field of Classification Search
CPC .. F02M 43/04; F02M 47/027; F02M 63/0045; F02M 45/086; F02M 55/002; F02M 2200/40
See application file for complete search history.

(56) References Cited

U.S. PATENT DOCUMENTS 5,205,326 A * 4/1993 Paley .................... F16L 55/033
                                                          138/30
5,282,570 A   2/1994 Johnson et al.
(Continued)

FOREIGN PATENT DOCUMENTS

CN       1425107 A      6/2003
DE    10335211 A1      2/2005
(Continued)

*Primary Examiner* — Joseph J Dallo
*Assistant Examiner* — Kurt Philip Liethen
(74) *Attorney, Agent, or Firm* — Fish & Richardson P.C.

(57) ABSTRACT

A dual-fuel injector for a fuel injection device, including: a liquid fuel injector unit with a nozzle needle assigned to a liquid fuel nozzle arrangement of the dual-fuel injector and which is stroke controllable via a first control chamber; and a gas injector unit with a gas nozzle needle assigned to a gas nozzle arrangement of the dual-fuel injector and which is stroke controllable via a second control chamber. Each of the control chambers can be impinged with a control fluid to control the stroke of the respective nozzle needle. The control fluid from both the control chambers can be discharged. The dual-fuel injector has a control fluid reservoir in which discharged control fluid from the first control chamber can be introduced; the dual-fuel injector is configured to impinge the second control chamber with control fluid from the control fluid reservoir for the stroke control of the gas nozzle needle.

11 Claims, 1 Drawing Sheet

(51) Int. Cl.
*F02M 45/08* (2006.01)
*F02M 47/02* (2006.01)
*F02M 55/00* (2006.01)
*F02D 19/10* (2006.01)
*F02D 19/06* (2006.01)

(52) U.S. Cl.
CPC ........ *F02M 45/086* (2013.01); *F02M 47/027* (2013.01); *F02M 55/002* (2013.01); *F02M 63/0045* (2013.01); *F02M 2200/40* (2013.01); *Y02T 10/36* (2013.01)

(56) References Cited

U.S. PATENT DOCUMENTS

| | | | |
|---|---|---|---|
| 6,336,598 B1 * | 1/2002 | Touchette | F02D 19/10 239/408 |
| 7,267,109 B2 | 9/2007 | Boehland et al. | |
| 8,733,326 B2 | 5/2014 | Kim et al. | |
| 2005/0287009 A1 * | 12/2005 | Kukitome | F04B 13/00 417/44.1 |
| 2009/0020631 A1 | 1/2009 | Mashida et al. | |
| 2013/0037622 A1 * | 2/2013 | Kim | F02M 43/04 239/5 |
| 2013/0047964 A1 | 2/2013 | Kim | |
| 2013/0048750 A1 | 2/2013 | Kim et al. | |
| 2013/0319373 A1 * | 12/2013 | Brown | F02M 43/04 123/456 |

FOREIGN PATENT DOCUMENTS

| | | |
|---|---|---|
| DE | 102012012450 A1 | 12/2012 |
| DE | 202013102660 A1 | 6/2013 |
| DE | 102013000596 A1 | 7/2014 |
| JP | 2006105008 A | 4/2006 |
| JP | 2010265855 A | 11/2010 |
| WO | 0015956 A1 | 3/2000 |
| WO | 2012072881 A1 | 6/2012 |

* cited by examiner

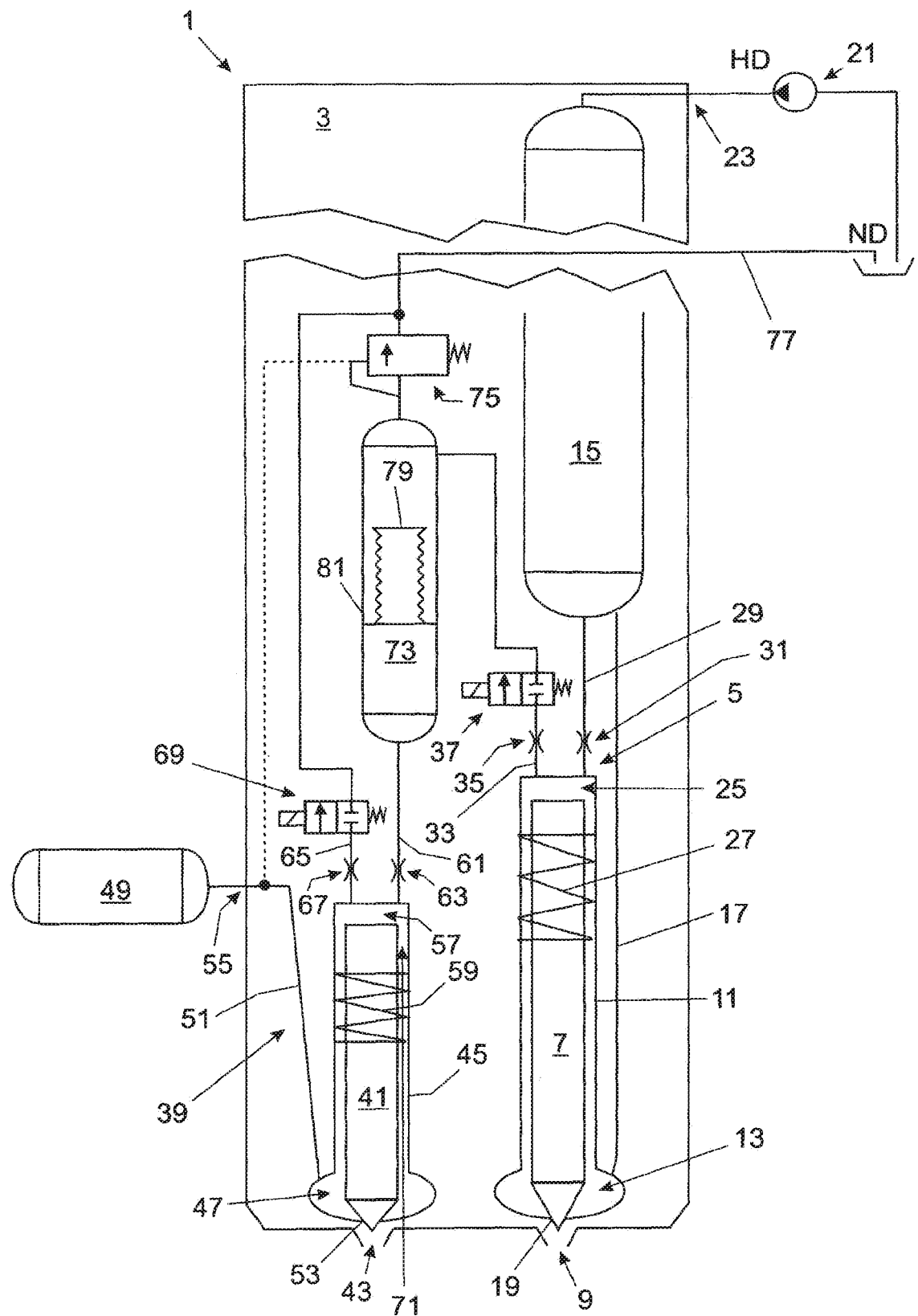

DUAL-FUEL INJECTOR

The present application is a 371 of International application PCT/EP2014/003046, filed Nov. 13, 2014, which claims priority of DE 10 2013 021 810.1, filed Dec. 20, 2013, the priority of these applications is hereby claimed and these applications are incorporated herein by reference.

BACKGROUND OF THE INVENTION

The present invention relates to a dual-fuel injector for a fuel injection device, in particular a combustion engine, in accordance with the preamble of claim 1. In particular, the dual-fuel injector can be used with ignition jet engines, which, in addition to an ignition jet mode using combustion gas (and a liquid fuel ignition jet), provide a pure liquid fuel mode. Diesel fuel, heavy oil or bio oil can be provided as a liquid fuel, for example.

In dual-fuel injectors of the type in question, which use liquid fuel for (indirect) control of the gas injector unit (the principle being pilot valve—actuator—control chamber), especially those which make use of high-pressure gas injection in combination with jet ignition by means of liquid fuel, there is often a not inconsiderable quantity of mixture leakage, i.e. via the guide of the respective gas nozzle needle, via which the gas nozzle chamber communicates with the control chamber. The gas component of this mixture leakage is separated out in separators, wherein the liquid fuel is fed back into the tank and the gas is re-compressed or introduced into the intake tract of the engine. This is disadvantageously complex.

SUMMARY OF THE INVENTION

Taking this as a starting point, it is the underlying object of the invention to specify a dual-fuel injector which helps to avoid the occurrence of mixture leakage.

The proposal according to the invention is for a dual-fuel injector (two-substance injector; in particular for a first, liquid, and a second, gaseous, fuel), in particular a diesel/gas injector. The dual-fuel injector is provided for a fuel injection device of a combustion engine, in particular, for example, for a gas common rail system. In general, the fuel injector is preferably provided for use with a combustion engine in the form of a gas engine, in particular one based on a spark-ignition or diesel engine (with internal mixture formation), and furthermore particularly with a large (diesel) engine. In addition to motor vehicle applications, the dual-fuel injector can be provided particularly in commercial vehicles or ships, and also for stationary applications, e.g. in combined heat and power plants or industrial environments.

The dual-fuel injector proposed is preferably provided for operation both in a pure liquid fuel mode and in the liquid fuel/gas mode, in particular with any proportion of gas/liquid fuel, especially in the ignition jet method.

The dual-fuel injector proposed according to the invention has a liquid fuel injector unit having a nozzle needle, which nozzle needle is assigned to a liquid fuel nozzle arrangement of the dual-fuel injector or of the liquid fuel injector unit and the stroke of which nozzle needle can be controlled by means of a first control chamber (of the dual-fuel injector). Depending on the stroke position of the nozzle needle, liquid fuel supplied to the injector can be discharged from the injector via the liquid fuel nozzle arrangement for an injection process, i.e. into a combustion chamber, e.g. in order to provide an ignition jet or for a pure liquid fuel injection process. To control the nozzle needle, the liquid fuel injector unit is thus preferably designed according to the principle of an indirectly controlled injector unit.

The dual-fuel injector proposed according to the invention furthermore has a gas injector unit having a gas nozzle needle, which gas nozzle needle is assigned to a gas nozzle arrangement of the dual-fuel injector or gas injector unit and the stroke of which gas nozzle needle can be controlled by means of a second control chamber (of the dual-fuel injector). Similarly to the liquid fuel injector unit, it is possible, depending on the stroke position of the gas nozzle needle, for combustion gas supplied to the injector to be discharged from the injector via the gas nozzle arrangement for a gas injection process, i.e. into the combustion chamber, in particular for the gas ignition jet mode. The gas injector unit—like the liquid fuel injector unit—preferably also operates according to the principle of an indirectly controlled injector unit in order to control the gas nozzle needle.

The gas nozzle needle can be arranged adjacent to or in a coaxial arrangement with the nozzle needle of the liquid fuel injector unit. The gas injector unit is preferably designed with a plurality of gas nozzle needles, that is to say, in particular, with in each case one associated second control chamber. The plurality of nozzle needles of the gas injector unit preferably surrounds the nozzle needle of the liquid fuel injector unit in the dual-fuel injector (in particular in a concentric ring arrangement with a central liquid fuel nozzle needle). In this way, a nozzle arrangement which is advantageous both in terms of installation space and, at the same time, has 360° coverage of the combustion chamber can be obtained.

The dual-fuel injector according to the invention is furthermore configured in such a way that the first and second control chambers can each be (hydraulically) supplied (controlled) with a control fluid in order to control the stroke of the respective nozzle needle, and control fluid can furthermore be discharged—in a controlled manner—from both the first and second control chambers. When a respective control chamber is supplied or controlled with control fluid, a nozzle needle with a stroke that is controlled by this means can be subjected to pressure (via the control fluid) and, in the case of discharge, it can therefore be relieved of load, i.e. at an end thereof remote from the nozzle. Liquid fuel, e.g. diesel fuel, is preferably provided as a control fluid common to the control chambers in the context of the invention.

According to the invention, the dual-fuel injector has—as a characteristic—a control fluid reservoir, into which discharged control fluid from the first control chamber can be introduced or, in the case of the liquid fuel injection mode of the dual-fuel injector (single fuel/dual fuel liquid fuel mode), is introduced. Here, the control fluid, in particular all of the control fluid, discharged from the first control chamber is fed (in particular exclusively) to the control fluid reservoir, in particular via a suitable flow connection of the first control chamber to the control fluid reservoir on the dual-fuel injector.

The dual-fuel injector is—as a characteristic—furthermore configured to supply or control the (respective) second control chamber with control fluid from the control fluid reservoir in order to control the stroke of the gas nozzle needle (thus, the control fluid reservoir—arranged between the first and second control chambers—can be referred to as an intermediate reservoir), in particular supplying or controlling it exclusively with control fluid from the control fluid reservoir and, furthermore, in particular in a dual fuel mode (gas/liquid fuel). For this purpose a suitable flow connection of the control fluid reservoir to the second control chamber can in turn be provided on the dual-fuel injector.

In the dual-fuel injector according to the invention, it is possible, in the case of preferred embodiments, in particular for a control fluid flow path or circuit to be provided on the injector, said possible path or circuit leading from an inlet of the fuel injector on the high-pressure side into the first control chamber and, downstream thereof or following the latter, into the control fluid reservoir, from the control fluid reservoir into the second control chamber and then to a (leakage) outlet of the injector on the low-pressure side. To discharge control fluid, it is possible here for a respective valve (pilot valve) to be provided in the flow connection between the first control chamber and the control fluid reservoir and in the flow connection between the second control chamber and the outlet on the low-pressure side, thus enabling each of these flow connections to be selectively interrupted. Thus, the injector can be produced with little outlay in terms of construction.

In an advantageously simple way, the dual-fuel injector according to the invention enables the second control chamber to be supplied in a stable manner with a control pressure matched to the gas pressure at the gas injector unit and can thus effectively prevent mixture leakage in a dual fuel mode by preventing gas from flowing across into the second control chamber or control fluid from flowing across into the gas part (gas nozzle chamber). The invention can therefore be used particularly in dual-fuel injectors of the type in question in which the at least one gas nozzle needle is guided in a needle guide of the gas injector unit, via which needle guide the second control chamber communicates with a gas nozzle chamber of the gas injector unit and the dual-fuel injector is configured to introduce combustion gas into the gas nozzle chamber.

The dual-fuel injector is preferably configured in such a way that—in particular in a dual fuel mode—a pressure level in the control fluid reservoir can be set to an (injection) gas pressure level of or at the gas injector unit (identical or substantially identical pressure level), e.g. to a constant pressure level (e.g. the supply gas pressure level) or a variable gas pressure level (e.g. the instantaneous injection pressure level). For this purpose, the dual-fuel injector preferably has a regulating device, in particular a valve, which is assigned to the control fluid reservoir, e.g. is arranged thereon. In this arrangement, the regulating device, in particular a self-regulating valve and/or pressure control valve, sets the pressure level of the control fluid in the control fluid reservoir to the gas pressure level at the gas injector unit. For pressure regulation by means of the valve, the control fluid reservoir can be relieved (via the valve), e.g. to the low-pressure side of the injector, to reduce the pressure.

In the context of a preferred development according to the invention, the dual-fuel injector or an injection device formed thereby can also be configured to set a pressure level of the control fluid in the control fluid reservoir at least temporarily to a pressure level—slightly—above a pressure level at which gas is made available at the gas injector unit for injection via the latter. In this way, it is possible advantageously to achieve nozzle needle lubrication by means of liquid fuel, for example, in an inexpensive manner. To set the pressure level, a regulating device such as that explained above can be provided on the fuel injector.

Further advantageous embodiments of the dual-fuel injector envisage that, in addition to the control fluid reservoir, the dual-fuel injector has a further control fluid reservoir, which is supplied with control fluid subjected to high pressure.

The further control fluid reservoir, which in the above-mentioned control fluid flow circuit is preferably arranged between the injector inlet on the high-pressure side and the first control chamber, is, in particular, an individual (high-pressure) fuel pressure reservoir of the fuel injector, in particular an individual pressure reservoir by means of which fuel at a system pressure (corresponding to control fluid) can also be fed to the nozzle arrangement of the liquid fuel injector unit. By means of the further control fluid reservoir, the first control chamber, i.e. the liquid fuel injector unit, can be controlled by or supplied with control fluid (subjected to high pressure). Both the control fluid reservoir and the further control fluid reservoir are preferably arranged together in a housing of the fuel injector.

Also conducive to the intended avoidance of mixture leakage, there is also a proposal within the scope of the invention for the gas injector unit to have a control or pilot valve for the controlled discharge of control fluid from the second control chamber, said valve being provided as a 3/2-way valve and allowing changeover operations substantially and advantageously without short-circuit leakage.

In addition, further preferred embodiments of the invention envisage that a device for pulsation or pressure surge damping is accommodated in the control fluid reservoir or, as an alternative or in addition, in the flow connection to the control fluid reservoir for example. To minimize pressure fluctuations, a pulsation damper, e.g. in the form of a bellows or a diaphragm, can be provided in the control fluid reservoir.

A further proposal within the scope of the invention is a fuel injection device having at least one dual-fuel injector as explained above. The fuel injection device is preferably configured to supply highly pressurized liquid fuel as a control fluid to the at least one dual-fuel injector, in particular from a fuel tank for liquid fuel and furthermore via a high-pressure generating device arranged downstream of the tank. In this arrangement, for a gas injection mode the fuel injection device is preferably also configured to set the pressure level in the control fluid reservoir to a pressure level below the high-pressure level of the control fluid supplied to the dual-fuel injector, in particular to set a pressure level matched to a gas pressure level at the gas injector unit.

The fuel injection device is furthermore preferably configured to operate the dual-fuel injector in an ignition jet mode and/or in a liquid fuel mode. Here, the gas injector unit is controlled particularly by means of the control fluid reservoir in the ignition jet mode.

Further features and advantages of the invention will become apparent from the following description of illustrative embodiments of the invention, by reference to the FIGURE of the drawings, which shows details essential to the invention, and from the claims. The individual features can each be implemented individually or severally in any desired combination in a variant of the invention.

Preferred embodiments of the invention are explained in greater detail below by means of the attached drawing, in which:

BRIEF DESCRIPTION OF THE DRAWING

FIG. 1 shows a dual-fuel injector according to one possible embodiment of the invention schematically and by way of example.

DETAILED DESCRIPTION OF THE INVENTION

In the following description and the drawings, elements with the same or a comparable function correspond to the same reference signs.

FIG. 1 shows a dual-fuel injector 1 (two-substance nozzle or two-substance injector) according to the invention for a fuel injection device of a combustion engine (internal combustion engine), preferably for a gas common rail system. The dual-fuel injector 1 is provided for the injection mode with a first, liquid fuel (particularly diesel fuel) and a second, gaseous fuel (combustion gas), i.e. both for a single fuel mode with liquid fuel and a dual fuel mode with combustion gas and a liquid fuel ignition jet.

The dual-fuel injector 1 has—in an injector housing 3—a liquid fuel injector unit 5 with a nozzle needle 7, which is assigned to a liquid fuel nozzle arrangement 9 of the dual-fuel injector 1. The nozzle needle 7 is accommodated in an axial bore 11 of the liquid fuel injector unit 5, which is simultaneously provided as a guide for the nozzle needle 7.

At the end of the axial bore 11 adjacent to the nozzle, a nozzle chamber 13 of the liquid fuel injector unit 5 is formed, into which liquid fuel subjected to high pressure can be introduced from an individual pressure reservoir 15 of the fuel injector 1, i.e. via a high-pressure fuel line 17. Depending on the stroke position of the nozzle needle 7 (open position/closed position), which can act for this purpose against a valve seat 19 at the end of the nozzle needle adjacent to the nozzle, fuel can be dispensed from the nozzle chamber 13 via at least one spray hole of the liquid fuel nozzle arrangement 9, i.e. for an injection process. The individual pressure reservoir 15 can be supplied via a rail or a high-pressure pump 21 of a fuel injection device, for example, i.e. via a fuel inlet 23 on the high-pressure side of the injector 1. Here, applied pressure levels above 2000 or even 2500 bar system pressure are possible.

At an end remote from the nozzle of the nozzle needle 7, said needle being capable of performing an axial stroke motion, a first control chamber 25 of the dual-fuel injector 1 is formed to enable the stroke of the nozzle needle 7 to be controlled—furthermore in interactive connection with a nozzle needle spring 27 (closing spring). The first control chamber 25 can be supplied on the part of the individual pressure reservoir 15 with control fluid in the form of the liquid fuel subjected to high pressure, for which purpose an (inlet) flow connection 29 having an inlet restrictor 31 is provided. From the first control chamber 25, the control fluid can also be discharged via a further (outlet) flow connection 33 having an outlet restrictor 35, wherein the further flow connection 33 can be selectively interrupted (for controlled discharge) by means of a first pilot valve 37 of the dual-fuel injector 1 or liquid fuel injector unit 5. The first pilot valve 37 can be provided in a structurally simple manner as a 2/2-way valve, in particular as a magnet-actuated valve.

In a manner formed similarly to the liquid fuel injector unit 5, the dual fuel injector 1 furthermore has in the injector housing 3 a gas injector unit 39 having a gas nozzle needle 41, which is assigned to a gas nozzle arrangement 43 of the dual fuel injector or of the gas injector unit 39. The gas nozzle needle 41 is accommodated in an axial bore 45 of the gas injector unit 39, which axial bore 45 simultaneously serves to guide the gas nozzle needle 41.

At the end of the axial bore 45 adjacent to the nozzle, a gas nozzle chamber 47 of the gas injector unit 39 is formed, into which gaseous fuel in the form of combustion gas subjected to high pressure, e.g. from a combustion gas reservoir 49 or on the part of a combustion gas supply of a fuel injection device, can be introduced, i.e. via a combustion gas line 51. Depending on the stroke position of the gas nozzle needle 41 (open position/closed position), which can act for this purpose against a valve seat 53 at the end of the gas nozzle needle adjacent to the nozzle, combustion gas can be dispensed from the nozzle chamber 47 via at least one spray hole of the gas nozzle arrangement 43, that is to say for a gas injection process (into a combustion chamber of a combustion engine). In the context of combustion gas supply via a combustion gas inlet 55 of the injector 1, pressure levels of, for example, 300 bar can prevail at the gas nozzle chamber 47.

At an end of the gas nozzle needle 41 remote from the nozzle, said needle being capable of performing an axial stroke motion, a second control chamber 57 of the dual-fuel injector 1 is formed to enable the stroke of the gas nozzle needle 41 to be controlled—furthermore in interactive connection with a nozzle needle spring 59. Like the first control chamber 25, the second control chamber 57 can be supplied with control fluid in the form of the liquid fuel, for which purpose an (inlet) flow connection 61 having an inlet restrictor 63 is provided. From the second control chamber 57, the control fluid can also be discharged via a further (outlet) flow connection 65 having an outlet restrictor 67, i.e. to the low-pressure side LP of the injector 1, wherein the further flow connection 65 can be selectively interrupted (for controlled discharge) by means of a second pilot valve 69 of the dual-fuel injector or gas injector unit. The second pilot valve 69 can be provided in a structurally simple manner as a 2/2-way valve, in particular as a magnet-actuated valve. As an alternative associated with an advantageously negligible short-circuit leakage, the second pilot valve 69 can be provided as a 3/2-way valve.

In the case of the gas injector unit 39, in which—as with the liquid fuel injector unit 5—the stroke of the nozzle needle 41 is controlled indirectly by imposing and relieving the load on the control chamber 57 (via the control fluid), a leakage path 71 (shown on an enlarged scale) has evidently been opened up, via which the gas nozzle chamber 47 and the second control chamber 57 communicate with one another. Along or via such a leakage path 71, combustion gas and control fluid or liquid fuel can mix and consequently cause mixture leakage in the prior art.

As FIG. 1 illustrates, the dual-fuel injector 1 has, according to the invention, a control fluid reservoir 73 ((intermediate) fuel reservoir), into which discharged control fluid in the form of liquid fuel from the first control chamber 25 can be introduced. For this purpose, the further flow connection 33 (with outlet restrictor 35) from the first control chamber 25, which can be selectively interrupted by means of the first pilot valve 37, is routed to the control fluid reservoir 73, i.e. in such a way as to communicate. The control fluid which is discharged from the first control chamber 25 as part of a discharge process (relief of the first control chamber 25) flows downstream via the further flow connection 33 into the control fluid reservoir 73. In other words, the dual-fuel injector 1 is configured to fill the control fluid reservoir 73 from the first control chamber 25 via the discharge leakage or from the liquid fuel injector unit 5 via the discharge leakage. In the case of use with a fuel injection device, a filling operation takes place, for example, before each introduction of gas into a combustion chamber when an advance ignition oil quantity is injected. The control fluid reservoir 73 is accommodated in the housing 3 of the dual-fuel injector 1—as is preferably also the individual pressure reservoir 15.

It should be noted that the volume of the control fluid reservoir 73 should correspond to about 50 to 100 times the volume of the discharge leakage of an injection event of the gas injector unit 39. Particularly in the case of embodiments of the dual-fuel injector 1 in which the second pilot valve 69 is provided as a 3/2-way valve, which advantageously also causes only a slight pressure drop in the control fluid reservoir 73 (during switching operations), the control fluid reservoir 73 can also be of smaller volume, for example, i.e. of space-saving construction.

As FIG. 1 further illustrates, the dual-fuel injector 1 is furthermore configured to supply the second control chamber 57 with control fluid from the control fluid reservoir 73 in order to control the stroke of the gas nozzle needle 41, i.e. to control the gas injector unit 39 with control fluid from the control fluid reservoir 73. The control fluid taken from the control fluid reservoir 73 to supply the second control chamber 57 with control fluid is fed via the inlet flow connection 61 (with restrictor device 63) to the second control chamber 57, said connection connecting the control fluid reservoir 73 to the second control chamber 57 in such a way that they communicate.

The provision of the control fluid reservoir 73 advantageously allows the use of the control fluid (liquid fuel) used for the liquid fuel injector unit 5 also to be used to control the gas injector unit 39, but at a different, lower pressure level (than in the liquid fuel injector unit 5). At the lower pressure level, it is now possible in an effective manner to avoid the control fluid flowing across into the gas nozzle chamber 47 of the gas injector unit 39, i.e. along the leakage path 71.

A pressure level set in the control fluid reservoir 73 preferably corresponds to the gas pressure level (injection pressure) at the gas injector unit 39. Here, flow of gas across into the second control chamber 57 is also avoided in an effective manner. To provide this functionality, the dual-fuel injector 1 preferably has a valve 75, in particular a valve 75 assigned to the control fluid reservoir 73, via which the pressure in the control fluid reservoir 73 can be adjusted to the pressure level of the gas pressure. The valve 75 is preferably a self-regulating valve, in particular a pressure control valve, to which the instantaneously prevailing pressure in the control fluid reservoir 73 can be fed as an input variable, plus an actual gas pressure value at the gas injector unit 39, for example, see the dashed signal line in FIG. 1. Provision can be made, for example, to adjust the control fluid reservoir pressure to a fixed value (constant value control), e.g. a value corresponding to an envisaged gas supply pressure (e.g. 300 bar) or following the instantaneous value, e.g. if the pressure is to be lowered in the case of partial-load matching (e.g. to 150 bar).

Using the valve 75, it is also possible, for example, at least temporarily, to set a pressure level in the control fluid reservoir 73 which is slightly above a gas (injection) pressure level at the gas injector unit 39. In this case, liquid fuel leakage (control fluid leakage) from the second control chamber 57 which occurs during this process can advantageously be used to lubricate the gas nozzle needle 41.

The valve 75, which, in particular, acts to reduce the pressure, is preferably arranged in a flow connection 77 which leads from the control fluid reservoir 73 to the injector low-pressure side (leakage) LP.

As illustrated in FIG. 1, the control fluid reservoir 73 furthermore preferably has a device 79 for pulsation damping, which is arranged in the control fluid reservoir housing 81. The device 79 for pulsation damping can make use of a bellows or, as an alternative or in addition, of a diaphragm or a piston arrangement, for example. In addition, other embodiments of pulsation damping devices are conceivable. Particularly owing to the reduced pressure level in the control fluid reservoir 73 relative to the high-pressure level (e.g. 2000 to 2500 bar) or system pressure level, the use of a damping device of this kind in the control fluid reservoir 73 is advantageously unproblematic.

Within the scope of the present invention, it is furthermore proposed to keep the ratio of the discharge quantities from the gas injector unit 39 to the liquid fuel injector unit 5 as small as possible. Provision is furthermore made to make the matching of the inlet and outlet restrictors such that the leakage quantity (control fluid) discharged from the first control chamber 25 with each ignition oil injection corresponds at least to 1.2 times the required control leakage for the gas injector unit 39.

With the proposed dual-fuel injector 1, it is possible not only to avoid mixture leakage but also effectively to counteract the occurrence of gas leakage. By virtue of the equal pressure level that can be set by means of the invention at the opposite ends of the gas nozzle needle 41 (control chamber/ 57 nozzle chamber 47), the equilibrium of forces on the gas needle 41 can furthermore be balanced in an improved way.

The invention claimed is:

1. A dual-fuel injector for a fuel injection device, comprising:
   a liquid fuel nozzle arrangement;
   a liquid fuel injector unit having a liquid nozzle needle comprising a liquid valve seat at a first end, which is assigned to the liquid fuel nozzle arrangement, a stroke of the nozzle needle being controllable by a first control chamber that is partly defined by a second end of the liquid nozzle needle opposite the first end;
   a gas nozzle arrangement; and
   a gas injector unit having a gas nozzle needle comprising a gas valve seat at a third end, which is assigned to the gas nozzle arrangement, a stroke of the gas nozzle needle being controllable by a second control chamber that is partly defined by a fourth end of the gas nozzle needle opposite the third end;
   wherein the first control chamber is supplied with a control fluid in order to control the stroke of the liquid nozzle needle, and the control fluid is dischargeable from the first control chamber to the second control chamber; and
   a control fluid reservoir, into which discharged control fluid from the second control chamber is introducible;
   wherein the dual-fuel injector is configured to supply the control fluid to the second control chamber from the first control chamber for the control of the stroke of the gas nozzle needle;
   wherein the dual-fuel injector is configured to set a pressure level of the control fluid to the second control chamber from the control fluid reservoir for the control of the stroke of the gas nozzle needle;
   wherein the dual-fuel injector is configured to set a pressure level of the control fluid in the control fluid reservoir to a pressure level equal to or slightly greater than a gas injection pressure level provided at the gas injector unit for injection via the gas injector unit.

2. The dual-fuel injector according to claim 1, further comprising a valve by which a pressure level in the control fluid reservoir is set.

3. The dual-fuel injector according to claim 1, further comprising a further control fluid reservoir that is supplied with control fluid subjected to high pressure, the first control chamber being supplied with the control fluid from the further control fluid reservoir.

4. The dual-fuel injector according to claim 1, wherein the dual-fuel injector is configured to supply the second control chamber and/or the gas injector unit with control fluid from the control fluid reservoir in order to control the stroke of the gas nozzle needle, wherein a control fluid pressure level in the control fluid reservoir is lowered relative to a control fluid pressure level for controlling the liquid fuel injector unit.

5. The dual-fuel injector according to claim 1, wherein the gas injector unit has a pilot valve for discharging control fluid from the second control chamber, wherein the pilot valve is a 3/2-way valve.

6. The dual-fuel injector according to claim 1, wherein the control fluid reservoir has a volume that corresponds to 50 times to 100 times a volume of the control fluid discharged via the second control chamber in an injection event of the gas injector unit.

7. The dual-fuel injector according to claim 1, further comprising a device for pulsation damping accommodated in the control fluid reservoir.

8. The dual-fuel injector according to claim 1, wherein
the dual-fuel injector has a flow connection and/or a flow connection selectively interruptible, via which flow connection discharged control fluid from the first control chamber is introduced into the control fluid reservoir; and/or
the dual-fuel injector has a flow connection via which the second control chamber is supplied with control fluid from the control fluid reservoir.

9. A fuel injection device, comprising at least one dual-fuel injector according to claim 1.

10. The fuel injection device according to claim 9, wherein the fuel injection device is configured to supply highly pressurized liquid fuel as a control fluid to the dual-fuel injector, wherein for a gas injection mode, the fuel injection device is configured to set a pressure level in the control fluid reservoir to a pressure level below a high-pressure level of the control fluid supplied to the dual-fuel injector.

11. The fuel injection device according to claim 9, wherein the fuel injection device is configured to operate the dual-fuel injector in an ignition jet mode and/or in a liquid fuel mode, wherein the gas injector unit is controlled by the control fluid reservoir in the ignition jet mode.

* * * * *